United States Patent

Meininger et al.

[11] 4,029,644
[45] June 14, 1977

[54] WATER-SOLUBLE, FIBER-REACTIVE MONOAZO DYESTUFFS

[75] Inventors: Fritz Meininger, Frankfurt am Main; Ludwig Schläfer, Fischbach, Taunus, both of Germany

[73] Assignee: Hoechst Aktiengesellschaft, Frankfurt am Main, Germany

[22] Filed: Nov. 6, 1975

[21] Appl. No.: 629,677

Related U.S. Application Data

[63] Continuation-in-part of Ser. No. 386,608, Aug. 8, 1973, abandoned, which is a continuation-in-part of Ser. No. 98,902, Dec. 16, 1970, abandoned.

[30] Foreign Application Priority Data

Dec. 19, 1969 Germany .......................... 1963673

[52] U.S. Cl. ............................................... 260/200
[51] Int. Cl.$^2$ .......................................... C09B 29/16
[58] Field of Search .................................... 260/200

[56] References Cited

UNITED STATES PATENTS

| | | | |
|---|---|---|---|
| 2,670,265 | 2/1954 | Heyna et al. | 8/49 |
| 3,202,652 | 8/1965 | Meininger et al. | 260/200 |
| 3,414,579 | 12/1968 | Remy | 260/199 X |
| 3,457,251 | 7/1969 | Meininger et al. | 260/198 X |
| 3,510,469 | 5/1970 | Sugiyama et al. | 260/200 |
| 3,515,716 | 6/1970 | Sugiyama et al. | 260/200 |
| 3,655,642 | 4/1972 | Meininger et al. | 260/196 X |

Primary Examiner—Charles F. Warren

Attorney, Agent, or Firm—Curtis, Morris & Safford

[57] ABSTRACT

A water-soluble monoazo-dyestuff of the formula

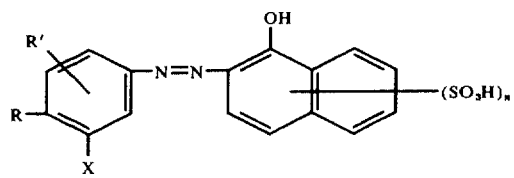

wherein R represents lower alkyl or lower alkoxy, R' represents hydrogen, lower alkyl or lower alkoxy, X represents $-SO_2-CH_2-CH_2-OH$, $-SO_2-CH_2-CH_2-O-SO_3H$, $-SO_2-CH_2-CH_2-O-PO_3H_2$, $-SO_2-CH_2-CH_2-S-SO_3H$ or $-SO_2-CH_2-CH_2-N$ (lower alkyl)$_2$, and $n$ stands for the integer 1, 2 or 3 said dyestuffs being suitable for the dyeing or printing of nitrogen containing native or synthetic fibrous materials and particularly of native or regenerated cellulose fibres with high tinctorial strength, the dyeings and prints obtained on the cellulose fibres being distinguished by considerable fastness properties to wear, to processing and to use. Padded or printed on cotton and fixed by different methods well known in the art, the novel dyestuffs yield prints or dyeings having the same clear shade that means they possess a very good constancy of shade in the use of different fixation processes. Used in printing processes they yield prints with sharp outlines.

6 Claims, No Drawings

WATER-SOLUBLE, FIBER-REACTIVE MONOAZO DYESTUFFS

This is a continuation-in-part application of U.S. Pat. application Ser. No. 386,608, filed Aug. 8, 1973, now abandoned, which is a continuation-in-part application of U.S. Pat. application Ser. No. 98,902, filed Dec. 16, 1970, now abandoned.

The present invention provides new water-soluble monoazo dyestuffs which, in the form of free acids, correspond to the formula (1)

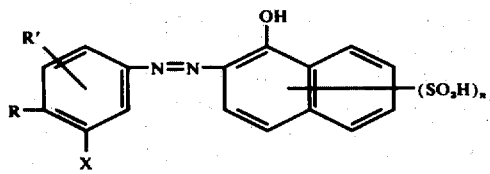

in which R represents an alkyl group having from 1 to 4 carbon atoms or an alkoxy group having from 1 to 4 carbon atoms, R' represents a hydrogen atom or an alkyl or alkoxy group having from 1 to 4 carbon atoms, X represents a grouping of the formula

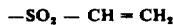

or

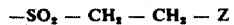

in which Z represents an inorganic or organic radical capable of being split off by alkalis or the hydroxy group, and $n$ stands for the integers 1, 2 or 3, as well as a process for their manufacture. According to this process, an aromatic amine of the formula (4)

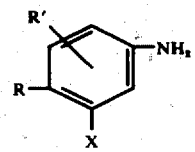

in which R, R' and X are as defined above, is diazotized and coupled with sulfonic acids or the formula (5)

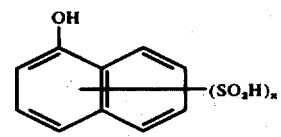

in which $n$ is as defined above, and, optionally a. the dyestuffs of the cited formula (1) obtained, in case X represents the grouping $-SO_2-CH_2-CH_2-OH$, are converted into dyestuffs having a grouping of the formula $-SO_2-CH_2-CH_2-Z$, in which Z represents an inorganic or organic radical capable of being split off by alkalis, by treating them with an inorganic or organic acid or its derivatives, for example sulfuric acid, amidosulfuric acid, phosphoric acid, polyphosphoric acid, thionyl chloride, acetyl chloride or p-toluene-sulfonic acid, or b. the dyestuffs of the cited formula (1) obtained, in case X represents the grouping of the cited formula (2), are converted into dyestuffs having the grouping of the formula $-SO_2-CH_2-CH_2-N(alkyl)_2$ or $-SO_2-CH_2-CH_2-SSO_3H$ by reacting them with a dialkylamine or an alkaline thiosulfate.

As radicals Z which may be split off by an alkaline agent, the following substances may for example be used: halogen atoms, for example chlorine or bromine atoms, an alkyl-sulfonic acid ester group having from 1 to 4 carbon atoms, or an aryl-sulfonic acid ester group, for example the phenyl- or toluyl-sulfonic acid ester group, an acyloxy group, for example the acetoxy group, furthermore the phenoxy group or a dialkylamino group, for example the dimethylamino or diethylamino group, the thiosulfuric acid ester group, phosphoric acid ester group, and especially the sulfuric acid ester group.

The dyestuffs of the invention are suitable for the dyeing or printing of nitrogen-containing natural and synthetic fibrous materials, for example wool, silk, polyamide and polyurethane fibre materials, but especially for the dyeing or printing of natural or regenerated cellulose fibres, for example cotton, spun-rayon, linen or viscose-rayon. On these materials, especially when applied according to the processes for reactive dyestuffs normally used in industrial practice, the dyestuffs of the invention have a good colour build-up and yield intense prints and dyeings of remarkable fastness properties to processing and use, especially of good fastness to water and to potting, to acid and alkali spotting, to light in the dry and wet state as well as to light in the presence of sweat or a perspiration liquid, to washing at 30° to 100° C, as at 60° or 95° C, also in the presence of sodium perborate or hypochlorite, to acid felting and to fulling, to acid cross-dyeing, to acid and to alkaline perspiration, to chlorinated water, to stoving and to weathering. Padded or printed on cotton and fixed by different methods well known in the art, especially the known One-Phase- and Two-Phase-Processes, such as Two-Phase-Processes wherein fixation is carried out by steaming, thermofixation, infrared-irradiation or hot alkaline baths or merely by storing for some hours at room temperaure, or One-Phase-Processes wherein the padding liquor or printing pastes already contain sodium or potassium carbonate or bicarbonate, and fixation is carried out by steaming, thermofixation or infrared-irradiation, the novel dyestuffs yield prints or dyeings having the same clear shade that means they possess a very good constancy of shade in the use of different fixation processes. Used in printing processes they yield prints with sharp outlines. The dyestuffs of the invention are superior to the monoazo dyestuffs of similar structure known from U.S. Pat. No. 3,202,652 as to build-up (ratio of dyestuff concentration used to colour intensity obtained), affinity, fastnesses to light and to weather as well as to staining and bleeding of the withe ground, when used on cellulose fibre materials according to modern printing techniques.

The following examples illustrate the invention; parts and percentages being by weight unless otherwise stated. The ratio of the parts by weight to the parts by volume is the same as that of a kilogram to a litre.

EXAMPLE 1

31.1 Parts of 4-methoxy-1aminobenzene-3-β-sulfate-ethylsulfone are dissolved neutral in 100 parts of water and diazotized at 0° to 5° C with 20 parts by volume of 5N sodium nitrite solution. 22.4 Parts of 1-naphthol-4-sulfonic acid are dissolved neutral in 100 parts of water and combined with the solution of the diazonium salt. A pH of 5 to 7 is maintained, and the whole is stirred for 2 hours. The monoazo dyestuff is salted out by adding 15% of sodium chloride in order to separate the dyestuff, suction-filtered and washed. After drying at 80° to 100° C, 61 parts of an about 80% salt-containing dyestuff are obtained which, in form of the free acid, corresponds to the formula

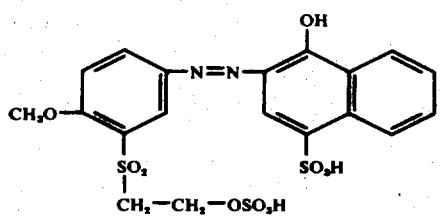

On wool, silk, polyamide and polyurethane fibres as well as on cellulose fibre materials, and applied by means of the dyeing methods normally used for reactive dyestuffs, the dyestuff yields clear orange dyeings and prints of excellent build-up which are distinguished by their good fastnesses to light and to wet processing. Applied in a long bath, the dyestuff has a very good affinity to cotton.

The prints show the sharpness of the outlines and the purity of the white ground already mentioned.

EXAMPLE 2

80 Parts of diethylamine are added at 30° C to a neutral solution of 62.6 parts of the dyestuff of the formula

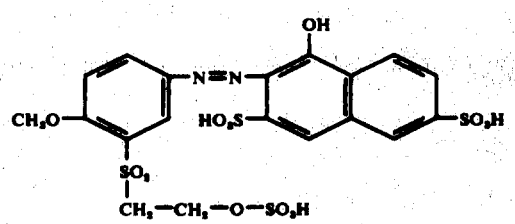

in 1,000 parts of water. The pH is adjusted to 12 to 12.5 by adding dropwise 33% sodium hydroxide solution, and the whole is stirred at room temperature for 12 hours. Subsequently, the pH is adjusted to 5 to 6 by adding 20% hydrochloric acid, the whole is combined with 20% of potassium chloride, and the reaction mixture is cooled to 5° C. After 4 hours, the precipitated dyestuff is suction-filtered and dried in vacuo.

77 Parts of an about 70% dyestuff are obtained which, in form of the free acid, corresponds to the formula

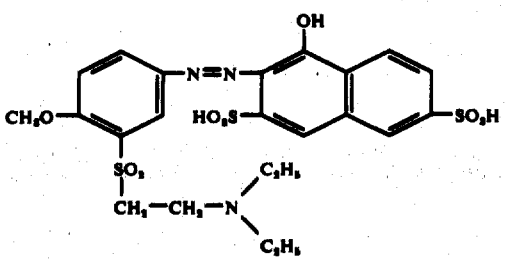

In the presence of alkaline agents, the dyestuff yields on cellulose fibre materials clear reddish orange prints having good fastnesses to light and to wet processing, an excellent sharpness of the outlines and purity of the white ground. Printing pastes made with this dyestuff and containing alkaline agents show a stability of several weeks at 20 C.

EXAMPLE 3

23,1 Parts of 4-methoxy-1-aminobenzene-3-β-hydroxy-ethylsulfone sulfone are dissolved in 200 parts of water by adding 40 parts of concentrated hydrochloric acid and then diazotized at 0° to 5° C with 20 parts by volume of 5N sodium nitrite solution. Subsequently, 22,4 parts of 1-naphthol-5-sulfonic acid are dissolved neutral in 100 parts of water and combined with the solution of the diazonium salt, thereby maintaining a pH of 5 to 6 by adding calcined sodium carbonate.

After several hours, the dyestuff is salted out with sodium chloride, filtered off and dried at 100° C. 46.5 g of a 90% salt-containing dyestuff are obtained which, in form of the free acid, corresponds to the formula

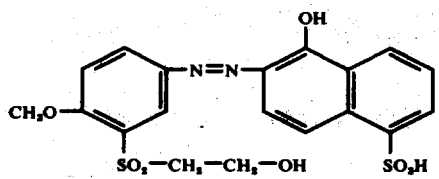

Printed on cellulose fibres in the presence of alkaline agents and subsequently thermofixed, the dyestuff yields prints fast to washing and to light.

EXAMPLE 4

The dyestuff obtained according to Example 3 is introduced within 1 hour into a mixture of 85 parts of polyphosphoric acid (84-85% of $P_2O_5$) and 15 parts of 80% orthophosphoric acid at a temperature of 130° C. Stirring is continued for another 1 to 2 hours until complete dissolution. Subsequently, the reaction mixture is poured into 150 parts of water and the whole is stirred for 2 hours at 80° to 90° C. Subsequently, the dyestuff is salted out with 20% of potassium chloride (calculated on the volume of the solution), and the precipitated phosphoric acid ester of the dyestuff is suction-filtered. The dyestuff so obtained corresponds in form of the free acid to the formula

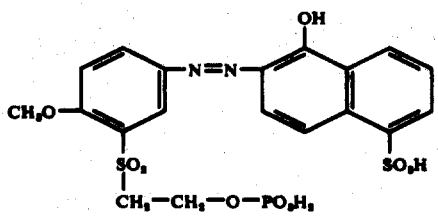

The moist filter cake is dissolved in 200 parts of water, adjusted to neutral by adding calcined sodium carbonate, and the solution is spray-dried. 52 Parts of a 75% dyestuff of the above constitution are obtained which dyestuff is very easily soluble in water. Applied on wool, silk, polyamide, polyurethane and cellulose fibre materials according to the processes for reactive dyestuffs normally used, the dyestuff yields clear yellowish red dyeings and prints having an excellent build-up and a good fastness to light as well as a very good fastness to wet processing. The prints obtained with this dyestuff show excellent sharpness of the outlines and purity of the white ground.

EXAMPLE 5

A neutral solution of 64 parts of the dyestuff of the formula

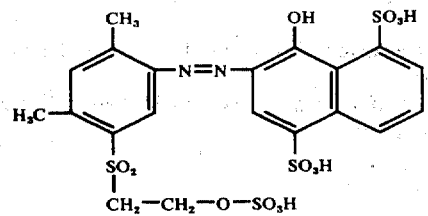

in 2,000 parts of water are adjusted to a pH of 11 to 12 at a temperature of 25° to 30° C by means of concentrated sodium hydroxide solution, stirred for ½ hour, and subsequently the pH is readjusted to 5 to 6. 37.5 Parts of crystallized sodium thiosulfate are added, and the whole is stirred for 6 hours at 60° to 65° C. The pH is maintained constant by adding dilute acetic acid. The dyestuff solution is filtered hot and spray-dried in vacuo. A red powder is obtained which very easily dissolves in water. The dyestuff obtained corresponds in form of the free acid to the formula

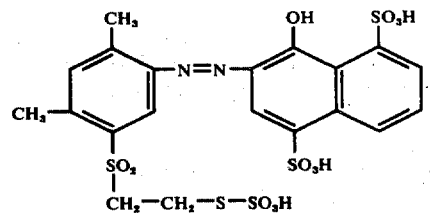

Applied on wool, silk, polyamide, polyurethane and cellulose fibre materials according to the processes normally used for reactive dyestuffs, the dyestuffs yields clear red dyeings and prints having a good fastness to light and very good fastnesses to wet processing. The prints show an excellent sharpness of the outlines and there is no staining or bleeding of the white ground.

EXAMPLE 6

The dyestuff obtained according to Example 3 is introduced at room temperature into 170 parts of concentrated sulfuric acid and stirred until complete dissolution. The reaction mixture is then stirred into 500 parts of ice and adjusted to neutral by means of 176 parts of calcined sodium carbonate, which causes the dyestuff to precipitate in part. Precipitation is completed with addition of potassium chloride. After drying in vacuo at 100° C, 67 parts of a 65% dyestuff are obtained which, in form of the free acid, corresponds to the formula

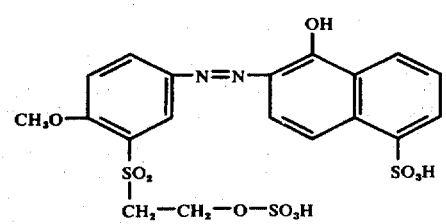

This dyestuff has the same good properties as the dyestuff of Example 4. In a similar manner as described in the aforementioned Examples, the dyestuffs listed in the following Table may be prepared. Applied on wool, silk, polyamide and cellulose fibre materials they yield dyeings and prints also having the already mentioned good fastness properties.

| Diazo component | Coupling component | Shade |
|---|---|---|
| 4-methoxy-1-aminobenzene-3-β-sulfato-ethylsulfone | 1-naphthol-3-sulfonic acid | orange |
| '' | 1-naphthol-3,8-disulfonic acid | '' |
| '' | 1-naphthol-8-sulfonic acid | '' |
| 4-ethoxy-1-aminobenzene-3-β-phosphato-ethylsulfone | 1-naphthol-4-sulfonic acid | yellowish red |
|  | 1-naphthol-5-sulfonic acid | '' |
| '' | 1-naphthol-3,6-disulfonic acid | '' |
| 4-methyl-1-aminobenzene-3-β-thiosulfato-ethylsulfone | 1-naphthol-4-sulfonic acid | orange |
| '' | 1-naphthol-5-sulfonic acid | '' |
| 4-methyl-1-aminobenzene-3-β-thiosulfato-ethylsulfone | 1-naphthol-3,6-disulfonic acid | '' |
| 2,4-dimethoxy-1-aminobenzene-5-β-sulfato-ethylsulfone | 1-naphthol-4-sulfonic acid | bluish red |
| '' | 1-naphthol-5-sulfonic acid | '' |
| '' | 1-naphthol-3,6-disulfonic acid | '' |
| '' | 1-naphthol-3,6,8-trisulfonic acid | '' |

I claim:
1. A water-soluble monoazo dyestuff of the formula

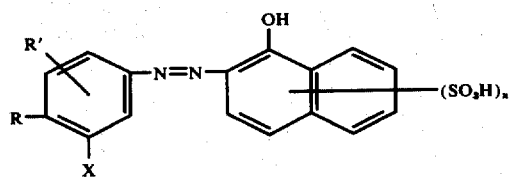

wherein R represents lower alkyl or lower alkoxy, R' represents hydrogen, lower alkyl or lower alkoxy, X represents —SO$_2$—CH$_2$—CH$_2$—OH, —SO$_2$—CH$_2$—CH$_2$—O—SO$_3$H, —SO$_2$—CH$_2$—CH$_2$—O—PO$_3$H$_2$, —SO$_2$—CH$_2$—CH$_2$—S—SO$_3$H or —SO$_2$—CH$_2$—CH$_2$—N(lower alkyl)$_2$, and n stands for the integer 1, 2 or 3.

2. The dyestuff of the formula as claimed in claim 1

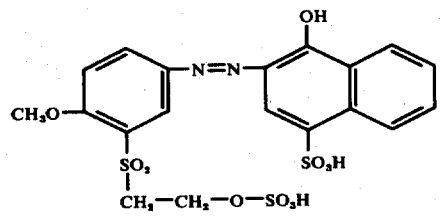

3. The dyestuff of the formula as claimed in claim 1

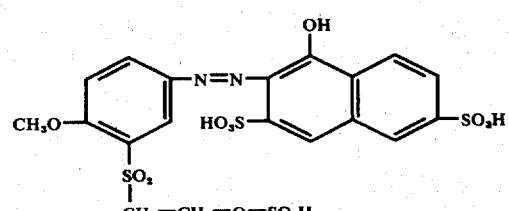

4. A dyestuff according to claim 1 of the formula
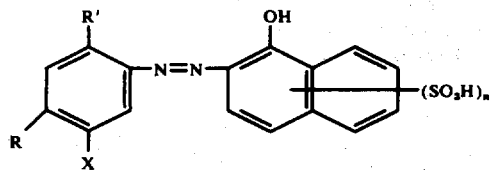
wherein R is lower alkoxy, R' is hydrogen or lower alkoxy and X and n are defined as in claim 1.
5. A dyestuff according to claim 1 of the formula
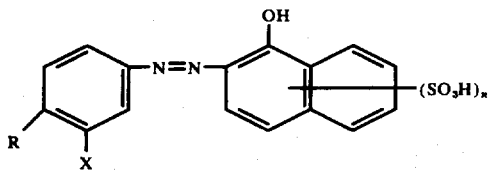
wherein R is lower alkoxy, n is 1 or 2 and X is defined as in claim 1.
6. A dyestuff according to claim 5 wherein X is β-sulfatoethylsulfonyl.
* * * * *